(12) United States Patent
Krah

(10) Patent No.: US 8,847,919 B2
(45) Date of Patent: Sep. 30, 2014

(54) INTERACTIVE HOLOGRAPHIC DISPLAY DEVICE

(75) Inventor: Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 843 days.

(21) Appl. No.: 13/019,971

(22) Filed: Feb. 2, 2011

(65) Prior Publication Data

US 2012/0194477 A1 Aug. 2, 2012

(51) Int. Cl.
| | |
|---|---|
| *G06F 3/042* | (2006.01) |
| *G03H 1/00* | (2006.01) |
| *G03H 1/22* | (2006.01) |
| *G03H 1/04* | (2006.01) |
| *G02B 27/22* | (2006.01) |
| *G06F 3/041* | (2006.01) |
| *G06F 3/0488* | (2013.01) |
| *G06F 3/0481* | (2013.01) |

(52) U.S. Cl.
CPC .......... *G02B 27/2292* (2013.01); *G06F 3/0428* (2013.01); *G06F 3/0416* (2013.01); *G06F 3/04883* (2013.01); *G06F 3/04815* (2013.01)
USPC ................. 345/175; 345/173; 359/1; 359/33; 359/35

(58) Field of Classification Search
USPC ................................ 345/173, 175; 359/1–35
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |

(Continued)

FOREIGN PATENT DOCUMENTS

| | | |
|---|---|---|
| JP | 2000-163031 A | 6/2000 |
| JP | 2002-342033 A | 11/2002 |
| WO | WO2010073024 * | 7/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kenneth Bukowski
(74) *Attorney, Agent, or Firm* — Fletcher Yoder PC

(57) ABSTRACT

A display apparatus configured to produce an interactive three-dimensional holographic image is disclosed. The display apparatus can include one or more coherent light sources configured to produce one or more beams, based on obtained image data of an object to display, and a lens assembly configured to direct the one or more beams to form a holographic image of the object. The lens assembly can include a collimating lens and a lens capable of beam steering one or more beams, including a micro-lens assembly with at least one micro-lens configured to generate a plurality of beams associated with a plurality of desired viewing angles. One or more optical sensors can be configured to obtain information regarding whether an interactive device interrupts the one or more beams, and a processor unit can determine a location of the interactive device with respect to the holographic image.

25 Claims, 13 Drawing Sheets

(56) References Cited

U.S. PATENT DOCUMENTS

| | | | |
|---|---|---|---|
| 6,650,318 B1 * | 11/2003 | Arnon | 345/168 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 2004/0066547 A1 * | 4/2004 | Parker et al. | 359/15 |
| 2006/0026521 A1 | 2/2006 | Hotelling et al. | |
| 2006/0197753 A1 | 9/2006 | Hotelling | |
| 2010/0149311 A1 * | 6/2010 | Kroll et al. | 348/40 |
| 2010/0165307 A1 * | 7/2010 | Mizushima et al. | 353/98 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Anonymous. (2007). "Rendering for an Interactive 360° Light Field Display," *ICT Graphics Lab*, SIGGRAPH 2007 Papers Proceeding, three pages.

Chun, W-S. et al. (2005). "Spatial 3-D Infrastructure: Display-Independent Software Framework, High-Speed Rendering Electronics, and Several New Displays," *Stereoscopic Displays and Virtual Reality Systems XII*, Woods, A. J. et al. eds., Proceedings of SPIE-IS&T Electronic Imaging, SPIE 5664:302-312.

Jones, A. et al. (2007). "Rendering for an Interactive 360° Light Field Display," *ACM SIGGRAPH 2007 Papers Proceeding*, pp. 1-10.

Langhans, K. et al. (Jan. 1998). "New Portable FELIX 3D Display," *Projection Displays IV, Proceedings of SPIE*, vol. 3296, $10^{th}$ *International Symposium at Photonics West '98: Electronic Imaging: Science and Technology*, Jan. 24-30, 1998, San Jose, CA, 13 pages.

\* cited by examiner

INTERACTIVE HOLOGRAPHIC DISPLAY DEVICE

FIELD OF THE DISCLOSURE

This relates generally to a display apparatus, and more particularly, to an interactive three-dimensional holographic display device.

BACKGROUND OF THE DISCLOSURE

Holographic displays are used to display objects in three dimensions. Typically, a three-dimensional image requires a medium (e.g., spinning mirrors, steam, hot air, etc.) onto which the image is projected. However, conventional holographic imaging devices are not capable of providing a holographic display without the need of a reflective medium.

Moreover, many types of interactive devices are available for performing operations in a computing system. Interactive display screens (e.g., touch screens, in particular) are becoming increasingly popular because of their ease and versatility of operation as well as their declining price. Touch screens generally allow a user to perform various functions by touching (e.g., physical contact or near-field proximity) the touch sensor panel using a finger, stylus or other interactive object at a location dictated by a user interface (UI) being displayed by the display device. Typical touch screens, however, provide a two-dimensional display on a substantially flat surface. Typical interactive devices are incapable of providing an interactive three-dimensional holographic display device.

SUMMARY OF THE DISCLOSURE

Presently disclosed embodiments are directed to solving issues relating to one or more of the problems presented in the prior art, as well as providing additional features that will become readily apparent by reference to the following detailed description when taken in conjunction with the accompanying drawings.

This relates to a display apparatus configured to produce an interactive three-dimensional holographic image. A coherent light source can produce one or more beams, based on obtained image data of an object to display. A lens assembly can be configured to direct the one or more beams, by dynamically changing a deflection angle, to form a holographic image of the object based on a focal length of the lens and a location of an observer. Further, one or more optical sensors can be configured to obtain information regarding whether an interactive device interrupts the one or more beams, in order to determine a location of the interactive device (e.g., a user's finger) with respect to the holographic image, based on the obtained information from the one or more optical sensors.

According to an embodiment, the lens assembly can include a first lens receiving and collimating a plurality of beams, and a second lens with a surface function capable of beam steering the one or more beams. The second lens can include a micro-lens assembly, such that at least one micro-lens is configured to generate a plurality of beams associated with a plurality of desired viewing angles.

Another embodiment is directed to method for producing an interactive three-dimensional holographic image. The method can include generating one or more beams, based on obtained image data of an object to display, and directing the one or more beams to form a holographic image of the object. Information regarding whether an interactive device (e.g., a stylus or a user's finger) interrupts the one or more beams can be obtained, and a location of the interactive device can be determined with respect to the holographic image, based on the obtained information.

DETAILED DESCRIPTION

In the following description of embodiments, reference is made to the accompanying drawings which form a part hereof, and in which it is shown by way of illustration specific embodiments in which the invention can be practiced. It is to be understood that other embodiments can be used and structural changes can be made without departing from the scope of the disclosed embodiments.

This relates to a display apparatus configured to produce an interactive three-dimensional holographic image. A coherent light source can produce one or more beams, based on obtained image data of an object to display. A lens assembly can be configured to direct the one or more beams, by dynamically changing a deflection angle, to form a holographic image of the object based on a focal length of the lens and a location of an observer. Further, one or more optical sensors can be configured to obtain information regarding whether an interactive device interrupts the one or more beams, in order to determine a location of the interactive device (e.g., a user's finger) with respect to the holographic image, based on the obtained information from the one or more optical sensors.

A holographic image can be created, for example, with two parabolic mirrors that are facing each other. A 3D object to be imaged can be located in the center of the lower mirror assembly and the object can be projected through an opening in the top mirror assembly. In essence the mirror assembly can allow imaging of the object at a virtually infinite number of views, each at different viewing angles, creating a holographic image of the 3D object above the top mirror assembly.

The display apparatus, according to embodiments described herein, can create the same holographic image by projecting a plurality of object views, each at different viewing angles, above a lens assembly. A computer rendering engine, for example, can render a plurality of object views at different viewing angles based on a virtual object. Accordingly, a truly unobtrusive three-dimensional holographic display can be provided, without the need of a reflective medium. Moreover, a user can interact with the holographic image, based on information obtained from the optical sensors receiving reflected light from an interactive device interrupting a beam forming the image.

Figure 1A:
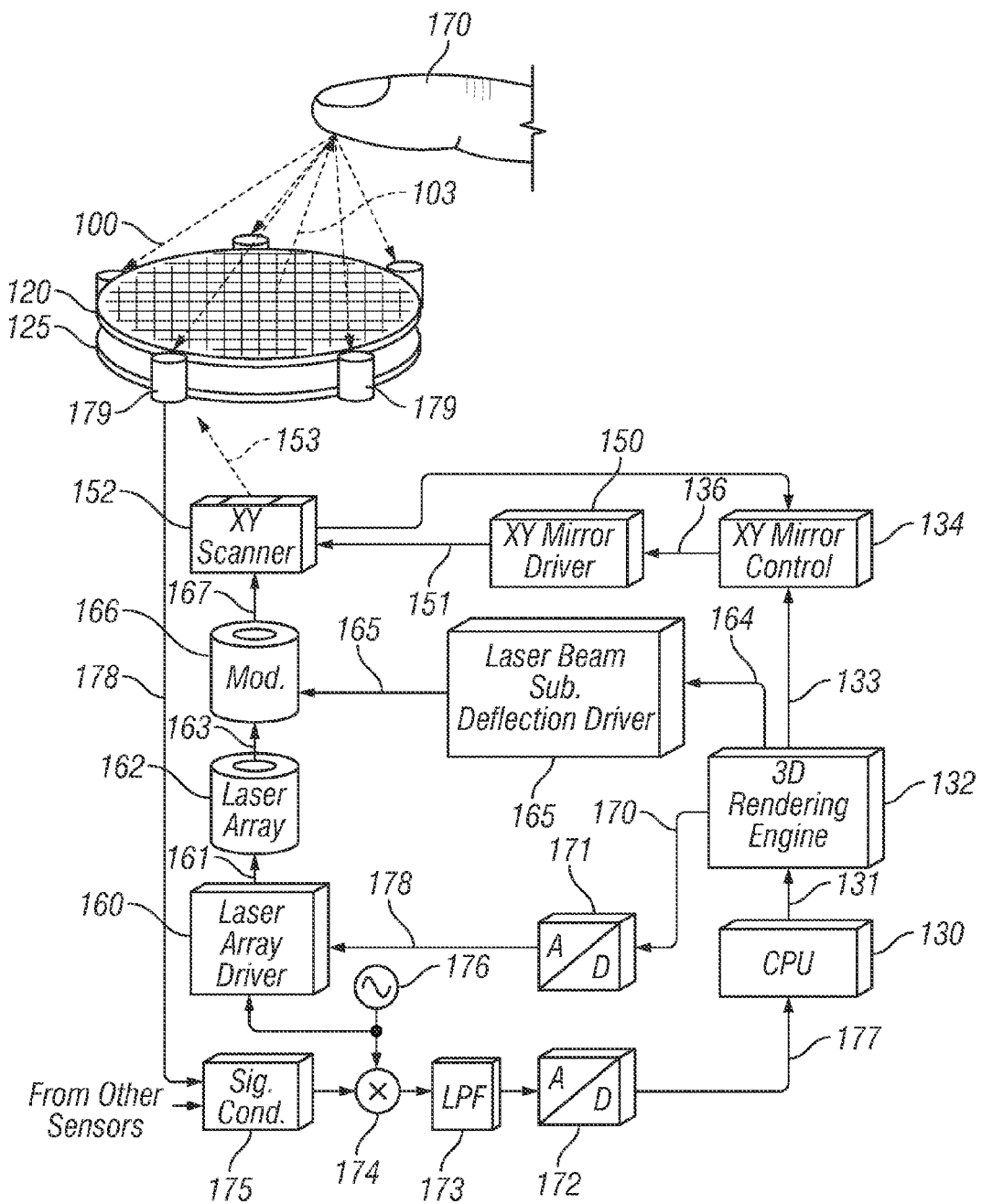
FIG. 1A illustrates an exemplary display apparatus configured to produce an interactive three-dimensional holographic image, according to one disclosed embodiment.

FIG. 1A illustrates an embodiment of a display apparatus configured to produce an interactive three-dimensional holographic image. As shown in FIG. 1A, a lens assembly 100 includes a bottom lens 125 that can be a collimating lens, which can redirect a beam 153 from an XY scanner 152 into a direction that is perpendicular to the bottom surface of the top lens 120, for example. It is noted that XY scanner 152 can project monochrome or multi-color beam(s) 153. The top lens 120 can then deflect the beam 110 into a direction that is dependent upon the surface function thereof.

3D rendering engine 132 can generate digital timing signals 133 for the XY mirror control 134, a digital RGB data stream 170 to analog to digital converter (ADC) 171 and digital sub deflection signals 164.

ADC 171 can generate analog signals representative of the RGB intensities from the 3D rendering engine. Each analog signal can be buffered by a driver 160 which then can drive a corresponding laser in laser array 162. Laser array 162 can also include an infrared laser which can be used to detect the location of a finger 170 using sensor 179. The infrared laser can be modulated by an oscillator 176. When the user interacts with the holographic image, the infrared laser beam can be reflected from the user's finger 170 and picked up by a plurality of sensors 179 arranged around mirror assembly 100, for example. The sense signals can be conditioned by one or more signal conditioners 175, which can include for example photodiode amplifier(s), or similar apparatus. The outputs from the signal conditioners 175 can be then demodulated by one or multiple demodulators 174 and then filtered by multiple lowpass filter(s) 172. ADC 171 can convert the analog signals to a digital signal for further processing by the CPU 130, for example. According to an embodiment, each sensor can have its own signal conditioner, demodulator, lowpass filter and/or ADC.

Digital sub deflection signals 164 can be comprised of two digital vectors X_SD and Y_SD, according to an embodiment. A laser beam sub deflection driver can convert X_SD and Y_SD to analog signals that can be buffered and control laser beam sub deflection modulator 166.

The phase-shift between the signal 176 and the received signal 178 can be a function of the distance the IR light traveled from laser array 163 to each of the sensors 179, among other variables. The demodulation gain can be a function of the cosine of the phase-shift and thus the digital results 177 out of ADC 172 can vary accordingly. In the particular implementation shown in FIG. 1A, results 177 can be comprised of 5 digital results, for example, one for each of the sensors 179. The location of where the user interacts with the holographic image can be derived by trilateration based on the plurality of sensor signals, and/or other techniques described below in more detail.

According to certain embodiments, the surface of top lens 120 can be comprised of a plurality of micro lenses 121 (see FIG. 2A) aligned in a predetermined pattern. Each micro lens 121 can have a deflection angle based on its focal length f and where beam 153 enters (e.g., perpendicular to the bottom surface of the top lens 120), with respect to the focal axis of the lens.

XY scanner 153 can project one or more beams at any given angle toward the lens assembly 100. Each micro lens 121 of the top lens 120 can be individually tuned, in order to provide a desired deflection angle $\phi$ based on its focal length f, depending on the location of an observer. Also, a modulation function can be added to the beam 110 over the entire micro lens array (i.e., the entire top lens 120), such that the beam can be active at desired micro lenses 121 and inactive where light should not be seen from the perspective of the observer (e.g., at predetermined deflection angles). The desired micro lens 121 at which the beam should be activated can be determined based on the location of the observer, such that the beam(s) can be angled from the micro lens to the eye of the observer to provide a three-dimensional illusion of the object to be displayed. According to this exemplary embodiment, with a plurality of beams 110 positioned by one or more micro lenses 121, the illusion of a displayed object at a certain point in space can be created.

Figure 1B:
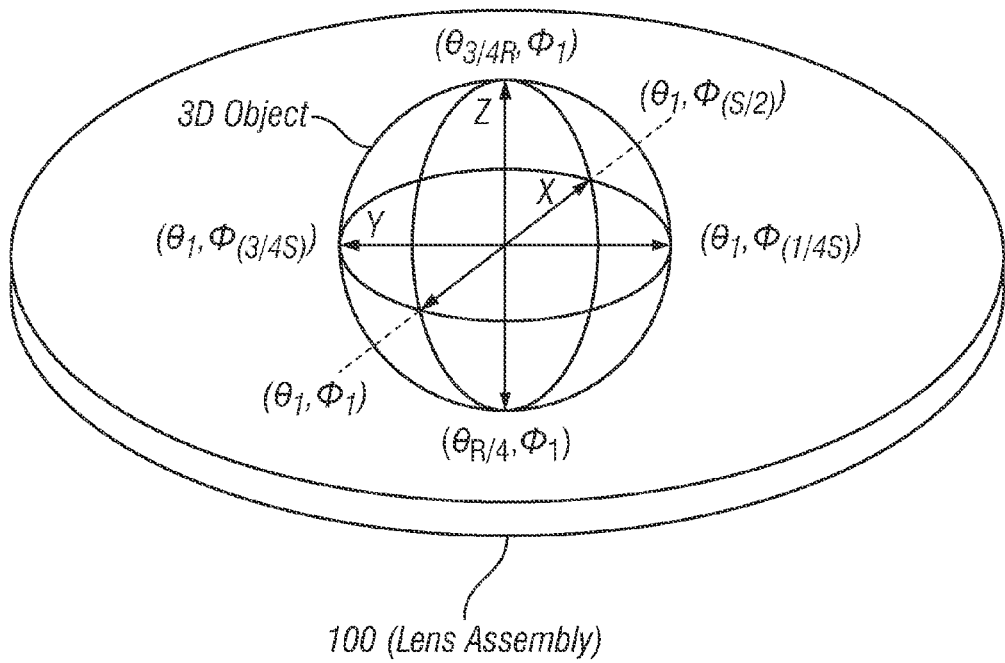
FIG. 1B illustrates exemplary parameters for an exemplary display apparatus configured to produce an interactive three-dimensional holographic image, according to one disclosed embodiment.

FIG. 1B shows various object views and associated parameters for an exemplary display apparatus configured to produce an interactive three-dimensional holographic image, according to one disclosed embodiment. For holographic viewing in a given viewing direction at least two object views can be needed: a first object view at a first viewing angle and second object view at a second viewing angle, the first object view creating a projection into the left eye, for example, while the second object view creates a projection into the right eye, for example. This can create a plurality of views, each object view having a unique inclination angle $\theta$ and azimuth angle $\phi$ relative to the surface of the micro-lens array. A total of R×S views can be generated where S is the maximum number of inclination angles and S is the maximum number of azimuth angles.

The x-axis of FIG. 1B can represent the viewing direction for views $(\theta_1,\phi_{(3/4S)})$ and $(\theta_1,\phi_{(1/4S)})$. The y-axis can represent the viewing direction for views $(\theta_1,\phi_1)$ and $(\theta_1,\phi_{(S/2)})$ and the z-axis can represent the viewing direction for views $(\theta_{3/4R},\phi_1)$ and $(\theta_{R/4},\phi_1)$. The field of view can be typically limited by the boundary of the lens array (i.e. a holographic object can not extend beyond the boundaries of the micro-lens array, according to one exemplary embodiment).

Optical sensors 179 can be fixed to or removably placed around lens assembly 100 and communicatively coupled to processor unit 130 and/or a host CPU. When an interactive device, such as a finger or a stylus (a finger 170 is depicted in FIG. 1A for exemplary purposes), interrupts a beam projected above lens assembly 100, the beam can be reflected back and received at one or more of optical sensors 179. Based on the modulation of the reflected beam, for example, which can be previously known by processor unit 130, processor unit 130 can determine where, with respect to the displayed image, the interactive device is located. Using trilateration, based on reflected modulated beams at a plurality of optical sensors

179, processor unit 130 can determine an accurate location of the interactive device (e.g., finger 179), with respect to the displayed image. Once a location of the interactive device is determined, a user can manipulate the displayed image using any known touch or multi-touch mechanisms (see FIG. 1D discussed below), without departing from the scope of the present disclosure.

Figure 1C:
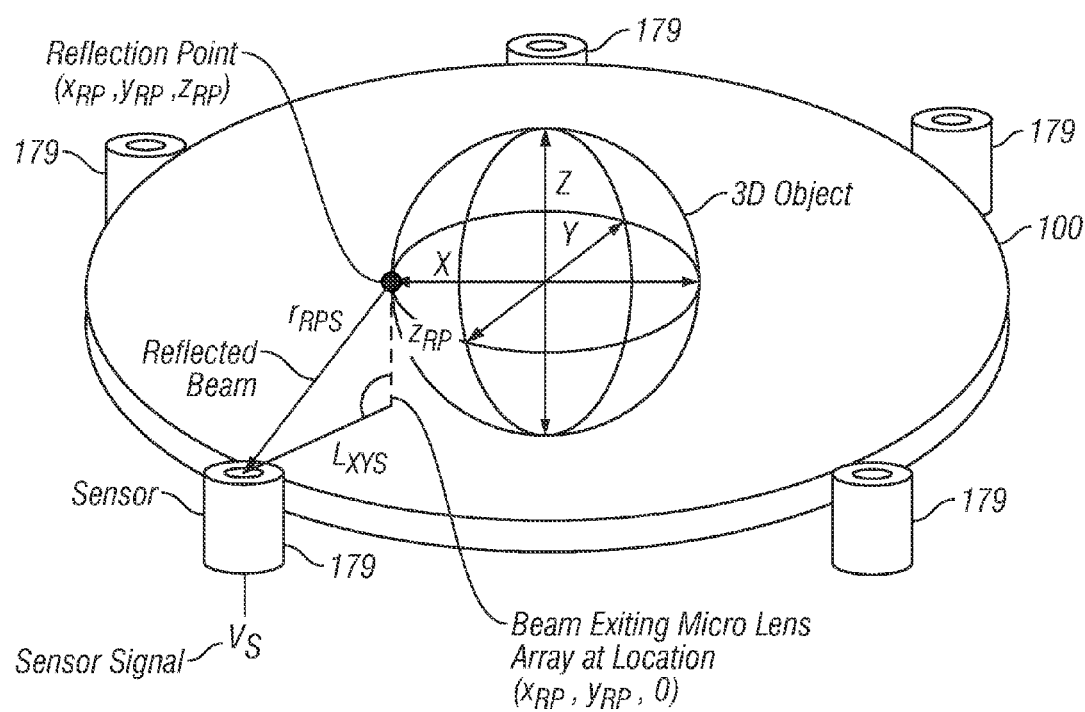
FIG. 1C illustrates an exemplary feedback system of an exemplary display apparatus, according to one disclosed embodiment.

FIG. 1C illustrates an exemplary feedback system of an exemplary display apparatus, according to one disclosed embodiment. The feedback system, as depicted in FIG. 1C can be used in order to determine the location of an object (such as a user's finger 170) and therefore enable the user to interact with the holographic object. The holographic display apparatus can have a dedicated touch scan to image the virtual display volume (e.g., the virtual volume into which the holographic object is projected). The sub deflection function during this touch scan can be adjusted such that the infrared laser beam, for example, exits the currently swept micro-lens perpendicularly (i.e. along the focal axis of the micro-lens currently being swept) (see, e.g., the description of the 3D rendering engine below with reference to FIGS. 3A and 3B).

An object above the micro lens array, according to the depicted example, can cause reflections, which are picked up by a plurality of sensors 179 arranged around the micro lens array. The (x,y) coordinate at which the reflection occurs can be determined, as the reflection point coincides with a particular micro-lens being swept. The only unknown may be the height above the micro-lens array at which the reflection occurs.

The distance the laser beam travels from the laser array to a given sensor can be expressed as $$r_{RPS} + z_{RP} + L_{LML} = L_{LS} \rightarrow r_{RPS} = L_{LS} - z_{RP} - L_{LML} \quad (1)$$

Here, $r_{RPS}$ is the unknown distance between the reflection point and the closest sensor, $z_{RP}$ is the unknown distance of the reflection point above the micro lens array, $L_{LML}$ is the known distance the laser beam travels between the laser array and the micro lens array and $L_{LS}$ is the measured distance between the laser array and the sensor closest to the reflection point. Parameter $L_{LML}$ can be determined based on the location of the micro lens being swept, the distance between the scanning mirror and the micro lens assembly and other known geometrical aspects of the micro lens array (e.g. thickness).

Since the above equation has two unknowns, a second equation may be needed to calculate $z_{RP}$:

$$z_{RP}^2 + L_{XYS}^2 = r_{RPS}^2 \quad (2)$$

Here $L_{XYS}$ is a known distance between the scanned micro lens at location ($x_{RP}$, $y_{RP}$) and a given sensor in the z-plane.

Substituting $r_{RPS}$ in the second equation with the first equation we obtain:

$$z_{RP}^2 = \frac{L_{XYS}^2 - (L_{LML} - L_{LS})^2}{2 \cdot L_{LML} - 2 \cdot L_{LS}} \quad (3)$$

The distance $L_{LS}$ between the laser array and a given sensor can also be expressed as:

$$L_{LS} = \frac{\varphi}{2 \cdot \pi} \cdot \lambda_{MOD} \quad (4)$$

$\lambda_{MOD}$ can be the wavelength of the modulation signal $f_{MOD}$ and can be expressed as:

$$c = \lambda_{MOD} \cdot f_{MOD} \rightarrow \lambda_{MOD} = \frac{c}{f_{MOD}} \quad (5)$$

$\varphi$ can be the phase shift the laser modulation signal incurs due to laser beam propagation from the laser array to a given sensor.

The phase shift $\varphi$ can be determined by homodyne mixing of the modulation signal with the received sensor signal Vs (see FIG. 1C). The signal output of the mixer can have two main frequency components, one at twice the modulation frequency ($f_{MOD} + f_{MOD} = 2*f_{MOD}$) the other one at DC ($f_{MOD} - f_{MOD} = 0$). Each frequency component can also include the phase shift $\varphi$ component a laser beam experiences.

A low-pass filter can filter out the higher frequency components leaving the DC term, which can have the form:

$$V_S = V_{CAL} \cdot \cos(\varphi) \quad (6)$$

Here $V_S$ can be the sensor signal and $V_{CAL}$ can be a scale value derived by calibration.

The distance between the laser array and the sensor can therefore be computed by combining Equations (4), (5) and (6):

$$L_{LS} = L_{LS0} \cdot \arccos(V_{SN}) \quad (7)$$

With substitutions:

$$L_{LS0} = \frac{c}{2 \cdot \pi \cdot f_{MOD}} \text{ and } V_{SN} = \frac{V_S}{V_{CAL}} \quad (8)$$

More than one sensor 179 can be used to determine $Z_{RP}$ and improve accuracy of object imaging and detection by selectively averaging the $z_{RP}$ readings for each sensor, for example.

Figure 1D:
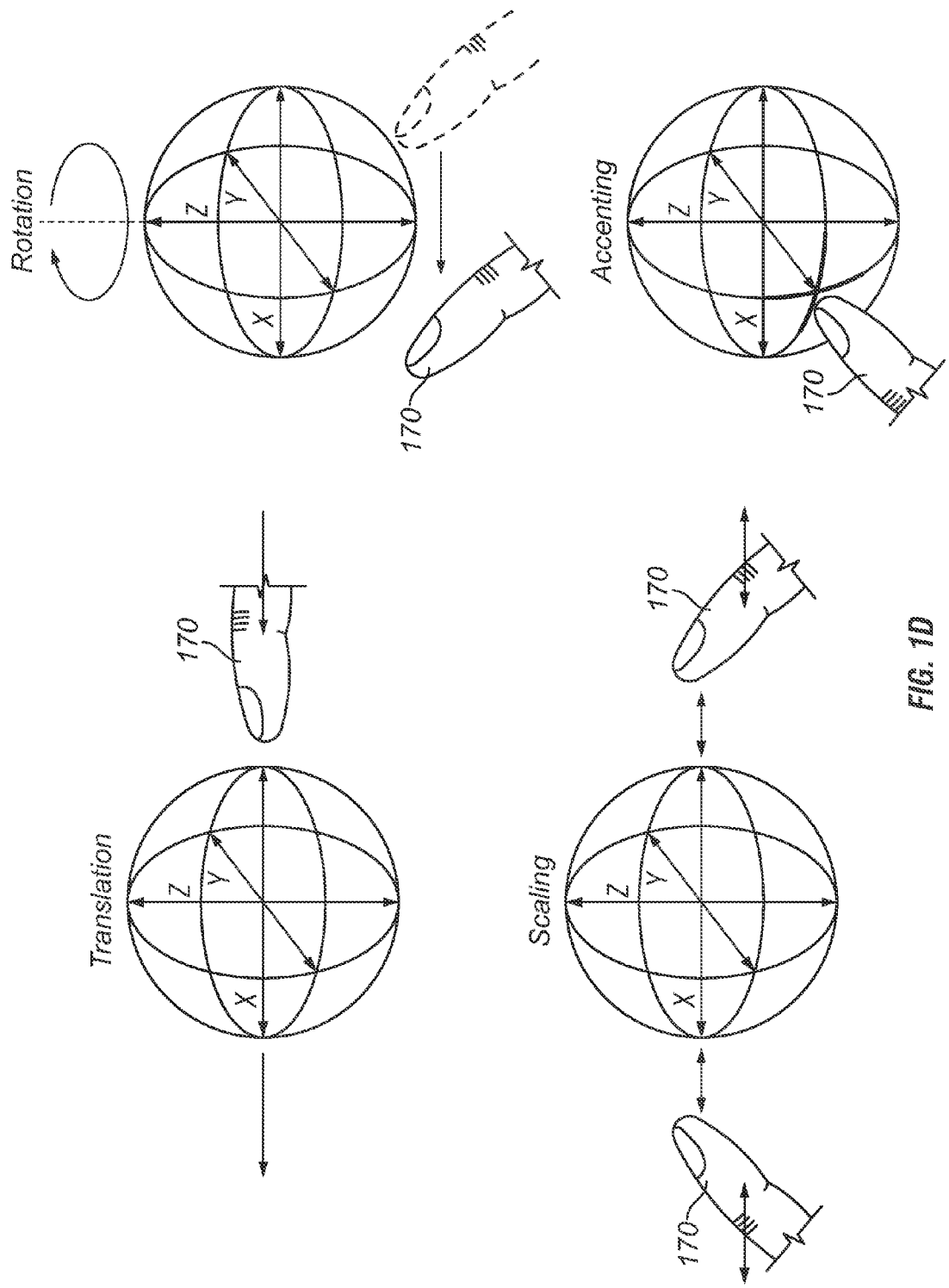
FIG. 1D illustrates various exemplary interactions with a holographic displayed three-dimensional image, according to one disclosed embodiment.

FIG. 1D illustrates various exemplary interactions with a holographic displayed three-dimensional image, according to one disclosed embodiment. As shown in FIG. 1D, a finger 170 approaching the holographic object may accent features of the object, such as intensity at the point where the finger approaches the holographic object (see the lower right portion of FIG. 1D).

Single finger gestures can be used to rotate and move the object in any direction. For example, a user's finger 170 approaching the holographic object from the right can move the object to the left after making contact with the objects projected surface (see the upper right portion of FIG. 1D). Linear motions can have inertia and the amount of inertia can be a function of how quickly the user's finger approaches or pushes the holographic object (see the upper left portion of FIG. 1D). Moving the finger parallel to the object surface can cause object rotation towards the direction of the finger movement. Rotation could have inertia such that the object keeps rotating at a rate proportional to the velocity of the finger movement.

Scaling of the holographic object can be accomplished by using at least 2 fingers (see the lower left portion of FIG. 1D). For example, scaling in the x-direction can be accomplished by touching the left side of the object with the left index finger and the right side of the object with the right index finger and then increasing or decreasing the distance between the index fingers to scale the holographic object up or down, respectively.

Figure 2A:
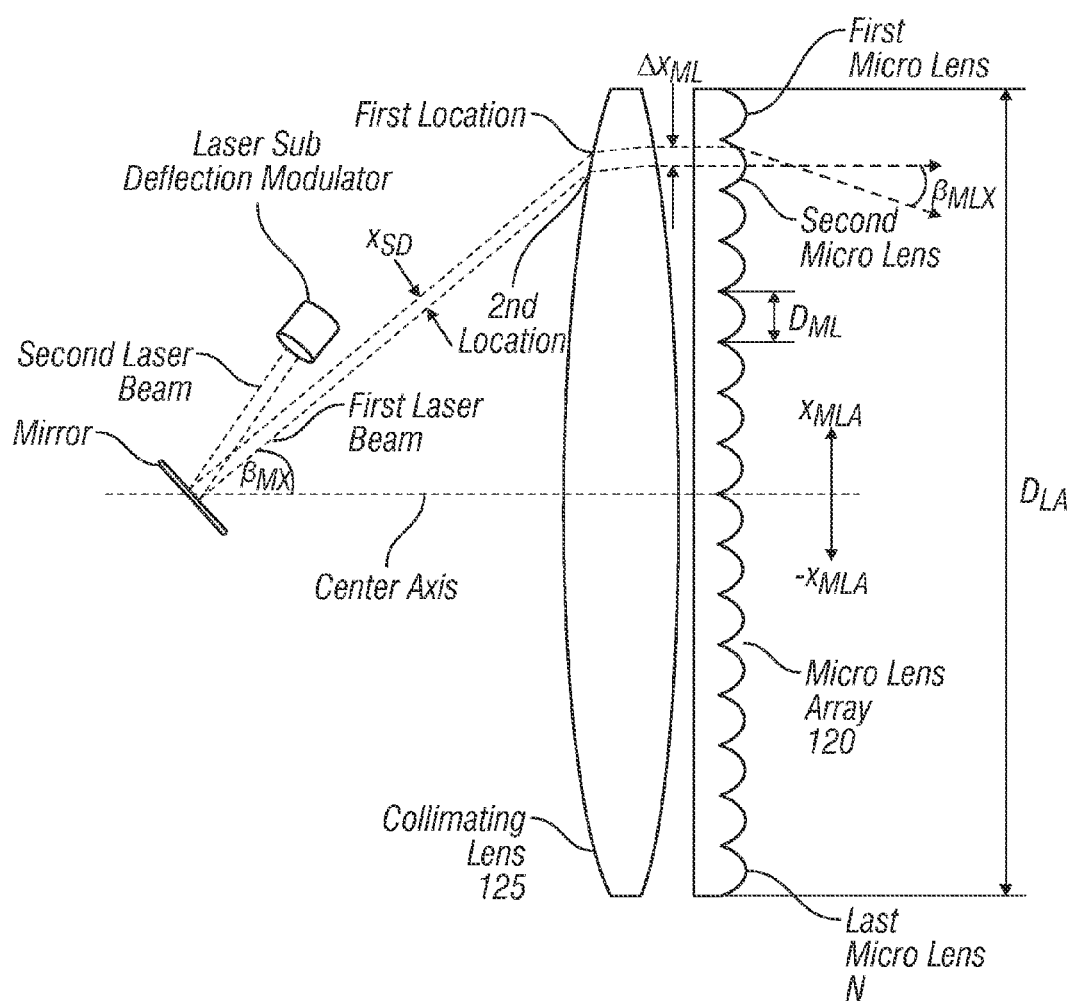
FIG. 2A shows a detailed side view of a path of a beam, according to one disclosed embodiment.

FIG. 2A shows the mirror and lens arrangement for one exemplary embodiment along the x-axis of the micro-lens array. Referring to FIG. 2A, the mirror can deflect the light from the sub deflection modulator toward the lens assembly. Two beam paths are shown to depict the effect of shifting the first laser beam by distance $x_{SD}$. The first laser beam can be deflected by the mirror at angle $\beta_{MX}$ into the collimating lens at a first location and the collimated beam can enter perpendicular to left side of the micro lens array and along the center axis of the $2^{nd}$ micro lens, according to the depicted exemplary embodiment. Since the first laser beam exits the $2^{nd}$ micro lens at its center, it may not experience any refraction in this example.

The $2^{nd}$ laser beam can be deflected by the mirror in a similar fashion but shifted by distance x.sub.SD by the sub deflection modulator 166, for example. The $2^{nd}$ laser beam can enter the collimating lens at a $2^{nd}$ location and enters the $2^{nd}$ micro-lens at a distance $\Delta x_{ML}$ away from the center of the $2^{nd}$ micro lens array. This can cause the $2^{nd}$ laser beam to be refracted by angle $\beta_{MLX}$ around the center axis of the $2^{nd}$ micro lens, according to the exemplary depicted embodiment. One of ordinary skill in the art would understand that deflection of the laser beam along the y-axis can be implemented in a similar fashion, yielding deflection angles $\beta_{MLY}$ based on distance $\Delta y_{ML}$, for example.

In order to depict how the determination of an appropriate deflection angle $\beta_{MLX}$ is made, FIG. 2A shows a side view of a path of a beam, according to the present embodiment. As shown in FIG. 2A, the beam from XY scanner 160 enters bottom, collimating lens 125 and exits such that the beam is perpendicular to the bottom surface of top lens 120.

Figure 2B:
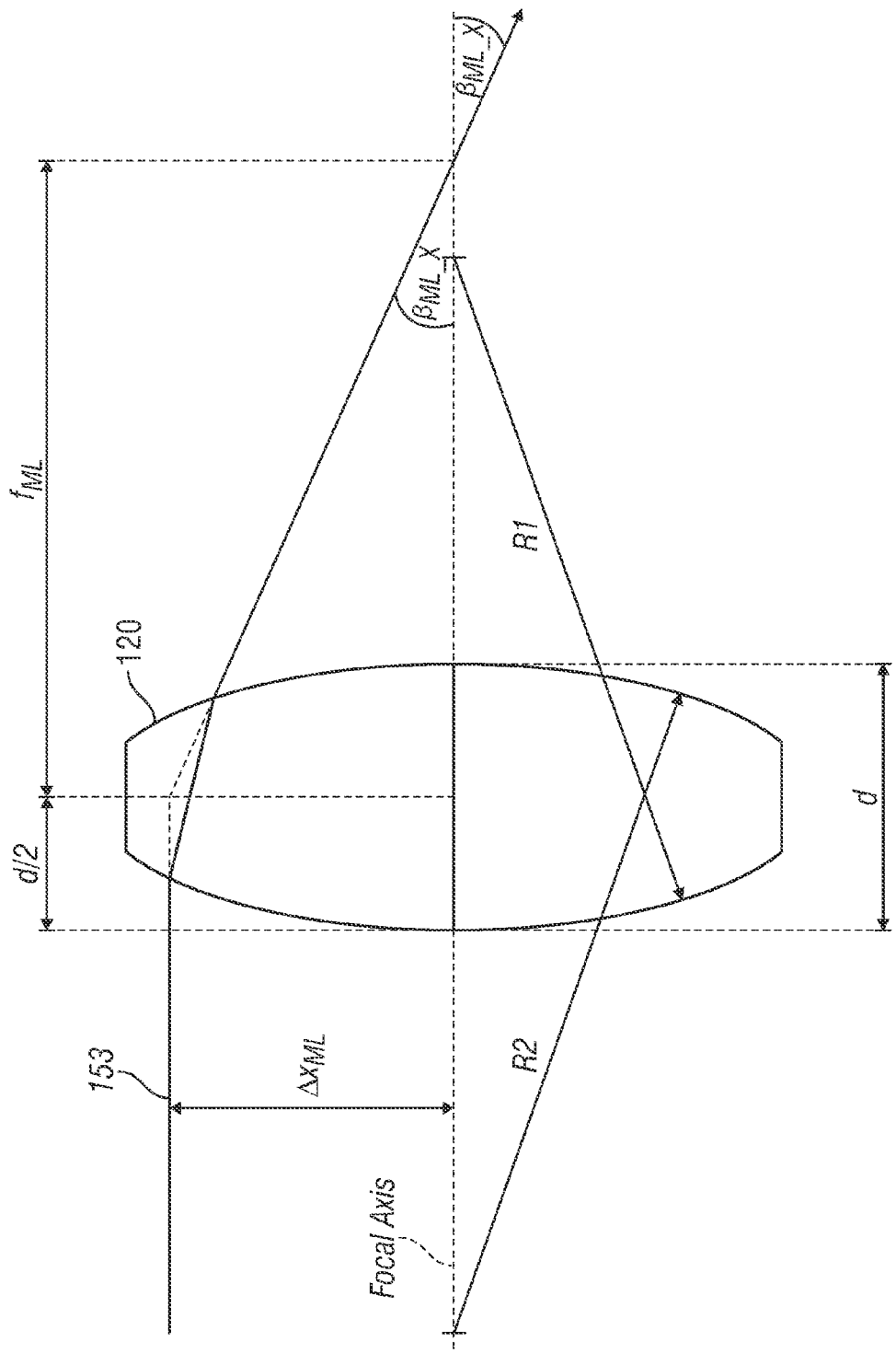
FIG. 2B shows a detailed side view of a path of a beam, according to one disclosed embodiment.

FIG. 2B shows a detailed view of a single micro lens. A laser beam from the collimating lens can enter the micro lens displaced by $x_{ML}$ relative to the focal axis and can get refracted upon entering and exiting the micro lens. The refracted exiting laser beam can pass through the focal point at a deflection angle $\beta_{ML\_X}$ with respect to the focal axis. The approximate deflection angle $\beta_{MLX}$ based on displacement $\Delta x_{ML}$ can be calculated by using the lens maker equation:

$$1/f_{ML}=(n-1)*(1/R1-1/R2+(n-1)*d/(n*R1*R2)) \quad (9)$$

where: $f_{ML}$=focal length of micro-lens 120;
n=refractive index of micro-lens material;
R1=radius of the curvature of the surface of micro-lens closest to the light source;
R2=radius of the curvature of the surface of the micro-lens farthest from the light source; and
d=thickness of micro-lens 120.

For approximation purposes it can be assumed that the axis of the laser beam from the collimator can intersect with the axis of the refracted laser beam at the center of the lens and then the deflection angle can be calculated as follows:

$$\tan \beta_{ML\_X}=(\Delta x_{ML}/f_{ML}) \quad (10)$$

Combining Equations (9) and (10) leads to an approximation of the deflection angle $\beta_{MLX}$:

$$\beta_{ML\_X}=\arctan(\Delta x_{ML}/((n-1)*(1/R1-1/R2+(n-1)*d/(n*R1*R2)))) \quad (11)$$

Controlling the deflection angle $\beta_{ML\_Y}$ of the laser beam based on displacement $\Delta y_{ML}$ relative to the focal axis can be accomplished in a similar fashion.

Since the refractive index of the micro lens material varies with the wavelength of red, green or blue laser beam components, special lens coatings or lens materials may be employed to mitigate chromatic aberration in the micro lens.

Each micro lens 121 can be a based on a electro optimal polymer, such that the micro lens is independently configurable (i.e., programmable) to cause phase shifts (i.e., using a change in refractive index), as desired when applied an electric field. Any transparent or electrooptical polymer can be used as well, such that by applying an electric field, determined by processor unit 130 and/or a host CPU (not shown), to a micro lens 121 can cause a predictable phase shift to light passing through. A programmable hydrophobic lens, for example, can similarly be used. As another alternative, a micro lens may be fixed with a particular refractive index and/or focal length.

It is noted that processor unit 130, and any other processing units, may include any number of devices or device combinations as known in the art. These include, for example, general purpose processors, content addressable memory modules, digital signal processors, application-specific integrated circuits, field programmable gate arrays, programmable logic arrays, discrete gate or transistor logic, or other such electronic components.

Furthermore, the steps of a method or algorithm described in connection with the embodiments disclosed herein can be embodied directly in hardware, in firmware, in a software module executed by processor unit 130, or in any practical combination thereof. A software module can reside in computer-readable storage (not shown), which can be realized as random access memory (RAM), flash memory, read only memory (ROM), erasable programmable ROM (EPROM) memory, electrostatically erasable programmable ROM (EEPROM) memory, registers, a hard disk, a removable disk, a compact disc (CD)-ROM, or any other form of storage medium known in the art. In this regard, computer-readable storage can be coupled to processor unit 330 so that the processor unit can read information from, and write information to, the computer-readable storage. In some embodiments, the computer-readable storage can include cache memory for storing temporary variables or other intermediate information during execution of instructions by the processor unit 130. In some embodiments, the computer-readable storage can include non-volatile memory.

Figure 2C:
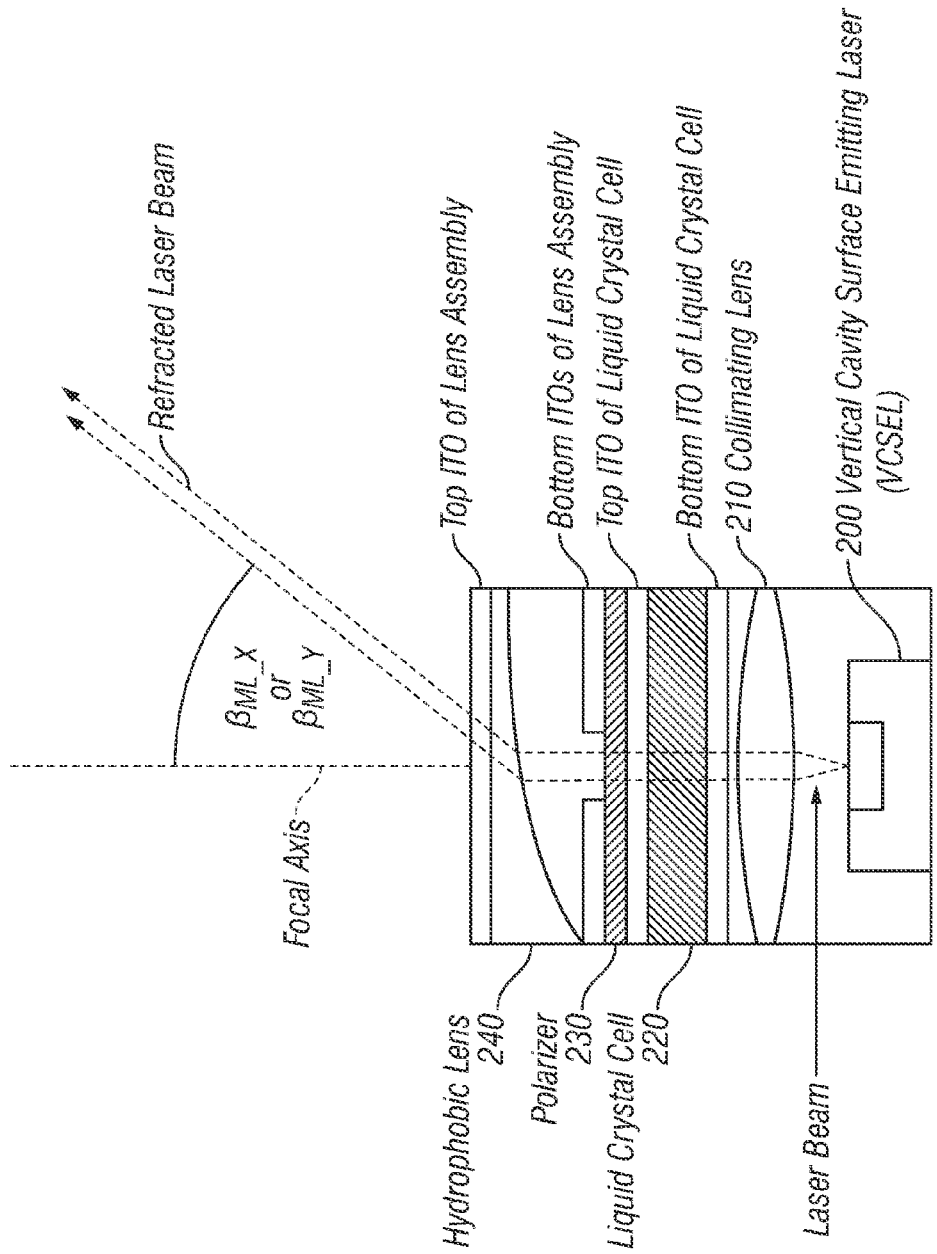
FIG. 2C illustrates an exemplary beam steering cell with an integrated light source, according to one disclosed embodiment.

FIG. 2C illustrates an exemplary beam steering cell 121 with an integrated light source, according to one disclosed embodiment. Each beam steering cell 121 can be composed of the following components:

a light source, such as a VCSEL (Vertical Cavity Surface Emitting Laser) 200;

a collimating lens 210, which can minimize the divergence of the laser beam;

a liquid crystal cell 220 with a polarizer 230, which can vary the intensity of the light emitted by the VCSEL. The liquid crystal cell 220 depicted in FIG. 2C is composed of Indium Tin Oxide (ITO); however, it is noted that various other transparent materials may be employed without departing from the scope of the present disclosure; and/or a lens assembly 240 (a hydrophobic lens is depicted for exemplary purposes), which can control the refraction of the intensity modulated laser beam. As noted above, ITO is used to form the lens assembly 249; however, it is noted that various other transparent materials may be employed without departing from the scope of the present disclosure. Of course, various other or alternative components may be included without departing from the scope of the present disclosure.

The laser beam can exit the VCSEL 200 and be collimated by collimating lens 210. The collimated laser beam can pass through a liquid crystal cell 220 where it can be polarized. The amount of polarization can be dependent on the applied voltage across the ITO, for example, at the top and bottom boundary of the liquid crystal cell 220. The polarizer above the liquid crystal cell 220 can allow some amount of the polarized laser light to pass, where the amount of light can be dependent on the voltage across the liquid crystal cell 220. The light passing through the liquid crystal cell 220 can pass through a hydrophobic lens 240. The amount of refraction and therefore the angle $\beta_{ML\_X}$ at which the laser beam exits the hydrophobic lens 240 assembly can be controlled by the voltage applied to the ITOs at the boundary of the hydrophobic lens 240 assembly. Multiple ITO elements, for example, can be used to shape the electric field within the hydrophobic lens 240 and thus control the surface tension and shape of the water droplet inside the hydrophobic lens 240 assembly.

Alternatively, the lens assembly 240 can be formed of a electro-optical polymer, whose refractive index varies with the applied electric field. Variation of the refractive index can cause variation of the focal length and therefore the angles $\beta_{ML\_X}$ and $\beta_{ML\_Y}$ at which the laser beam exists the lens assembly 240.

Each pixel may be comprised of three beam steering elements, according to an exemplary embodiment: one for each color, red green and blue. Lens assembly 240 can have a plurality of ITO electrodes to shape a water droplet such that the collimated and intensity modulated laser beam can be reflected at any angle $\beta_{ML\_X}$ and $\beta_{ML\_Y}$.

VCSEL 200 can be directly intensity modulated without the need for a liquid crystal cell, according to one embodiment. Also, one VCSEL 200 may be shared between multiple beam steering cells.

Beam steering cells can be arranged and addressed in a matrix configuration similar to pixels in a liquid crystal display, for example, or any other suitable configuration.

Figure 3A:
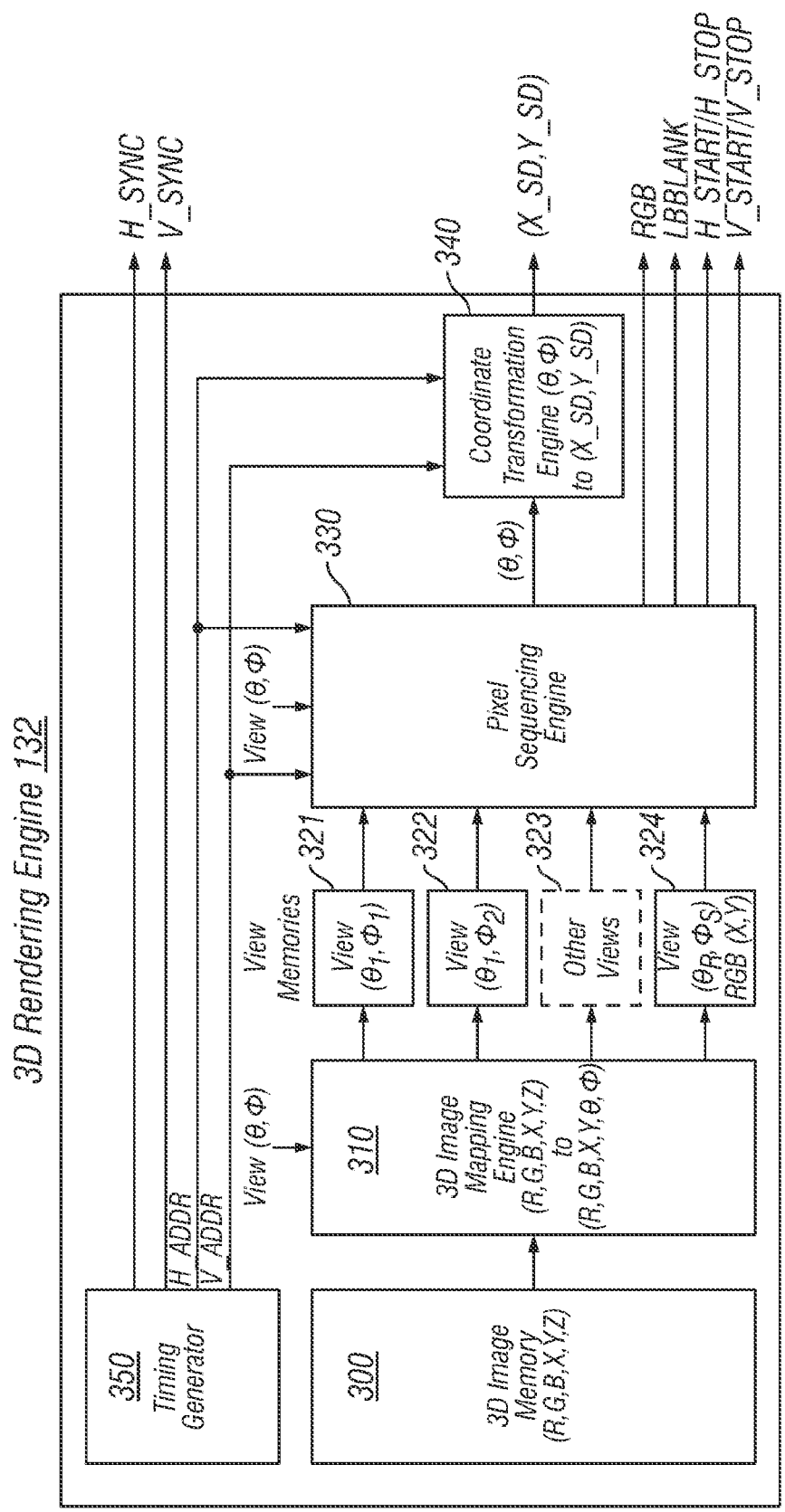
FIG. 3A shows an exemplary detailed 3D rendering engine, according to one disclosed embodiment.

FIG. 3A shows an exemplary detailed 3D rendering engine 132, according to an exemplary embodiment. According to the depicted embodiment, 3D image memory 300 can include the rendered 3D object. Each object pixel (or vortex) can have the format (R,G,B,X,Y,Z), where R, G and B can provide the pixel intensities of the red, green and blue pixel color components, respectively, and X, Y, Z can provide the x, y and z location of the pixels, respectively.

A mapping engine 310 can map a given 3D pixel to 2D space based on an azimuth and inclination angle and essentially performs the transformation: (R,G,B,X,Y,Z),→(R,G,B,X,Y,θ,φ), for example. The mapping engine 310 can create a plurality of views based a plurality of viewing angles (θ,φ) and store the views in a plurality of view memories 321-324.

The pixel sequencing engine 330 can sequence the pixels and viewing angles (θ,φ) from the view memories 321-324 based on the current scan location. A coordinate transformation engine 340 can map the plurality of viewing angles (θ,φ) in polar form to sub deflection values (X_SD, Y_SD) representative of angles $\beta_{MLX}$ and $\beta_{MLY}$, for example.

A timing generator 350 can generate the horizontal and vertical synchronization signals HSYNC and VSYNC, which can be required by the mirror driver, and also generate the horizontal and vertical addresses that can provide a current scan location of the micro lens array. Note that the 3D rendering engine 132 may be integrated in whole or in part into a graphics processor unit (GPU) or maybe entirely separate. Imaging mapping engine may generate the views in real time without the need or at least with substantially fewer view memories, according to an embodiment.

Figure 3B:
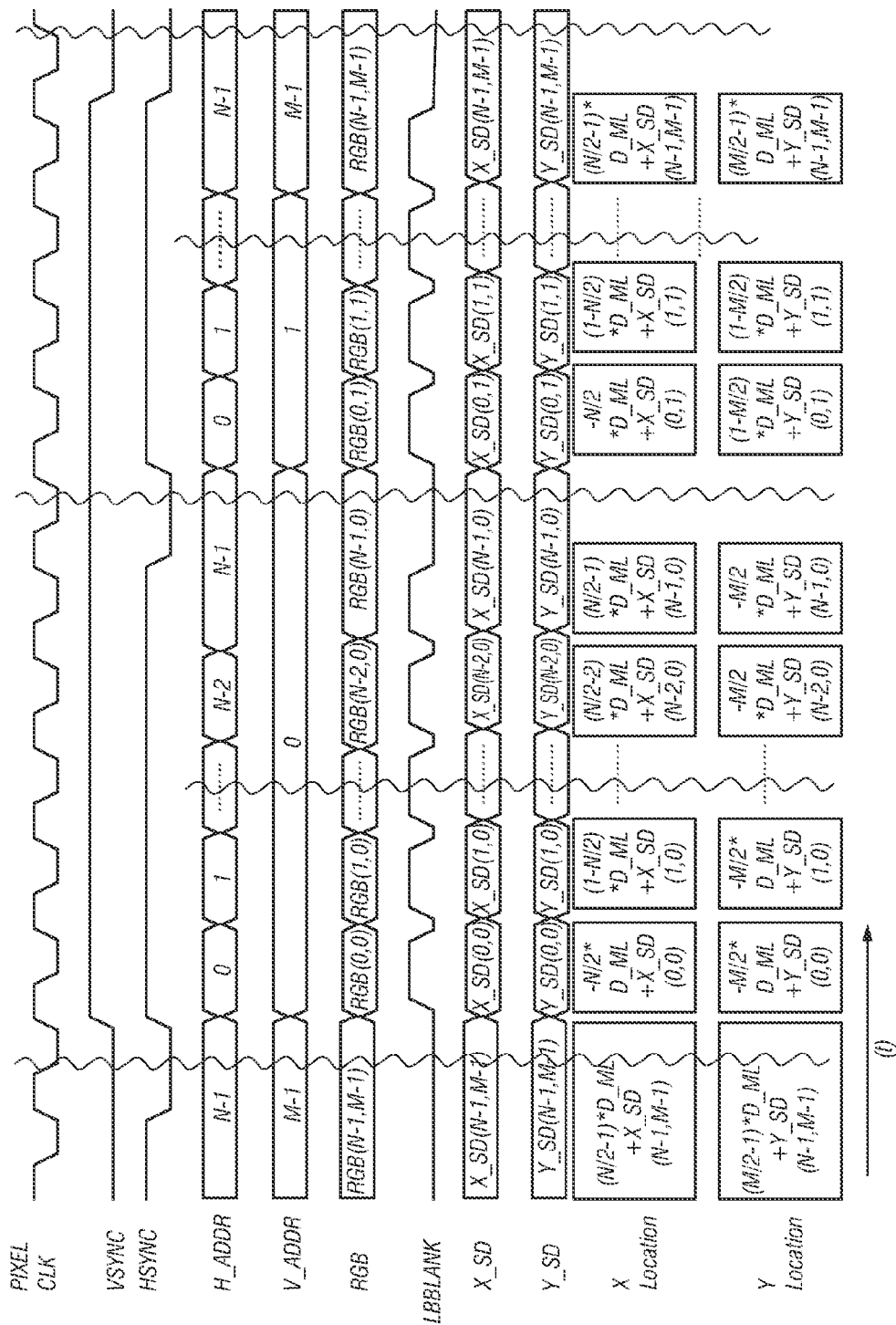
FIG. 3B shows an exemplary timing diagram of an exemplary display apparatus, according to one disclosed embodiment.

FIG. 3B shows an exemplary timing diagram of the exemplary holographic display device, according to one disclosed embodiment. The exemplary embodiment assumes that micro lenses can be arranged in a rectangular array of N×M micro lenses, according to the depicted embodiment. VSYNC and HSYNC can be the vertical and horizontal synchronization signals, which can be needed to synchronize the mirror control with the laser intensities and sub deflection parameters. H_ADDR and V_ADDR represent the horizontal and vertical addresses, respectively, of the micro-lens that is currently swept by the laser beam. LBBLANK is the laser blanking signal, which is asserted during assertion of VSYNC and or HSYNC and during pixel clock transitions.

Upon a VSYNC and HSYNC rising edge, the horizontal and vertical address can be reset and the first horizontal and vertical digital sub deflection values X_SD(0,0) and Y_SD(0,0) and associated intensity value RGB(0,0) for a micro-lens at location (0,0) can be loaded and the laser beam blanking signal can be de-asserted. The laser beam can be blanked via signal LBBLANK, for example, to ensure that the sub deflection modulator has stabilized.

The location along the x-axis that is currently swept can be presented as:

$$x_{MLA}=(H\_ADDR-N/2*D\_ML)+x_{SD} \quad (12)$$

H_ADDR is the horizontal (or X) address count, N is the number of micro lenses in x direction, D_ML is the diameter of a micro lens and $x_{SD}$ is the sub deflection distance associated with X_SD(H_ADDR, V_ADDR).

The location along the y-axis that is currently swept can be presented as:

$$y_{MLA}=((V\_ADDR-M/2)*D\_ML)+y_{SD} \quad (13)$$

V_ADDR is the vertical address count, M is the number of micro lenses in y direction, D_ML is the diameter of a micro lens and $y_{SD}$ is the sub deflection distance associated with Y_SD(H_ADDR, V_ADDR).

After the next rising edge of PCLK, the horizontal address count can be incremented, and the horizontal and vertical subdeflection values X_SD(1,0) and Y_SD(1,0), respectively, and associated intensity value RGB(1,0) for a microlens at location (1,0) can be loaded and the laser beam blanking signal can be de-asserted. The process can be repeated until the first row of N micro-lenses on the x axis are swept.

Upon the rising edge of the next HSYNC signal, the horizontal counter can be reset, the vertical row counter can be incremented by one, and the $2^{nd}$ row of micro lenses can be sweep. The entire process can be repeated until all N×M micro lenses are swept.

In one embodiment, a plurality of sub deflection values and laser intensity values can be retrieved during a single pixel clock period as to generate a plurality laser beam projections for a given micro lens. Each laser beam can have a deflection angle and intensity value associated with a unique object view.

In yet another embodiment, a given lens can be associated with a certain view. For example, every even micro lens can be associated with a first view at a first azimuth angle, every odd micro lens can be associated with a second view at a second azimuth angle, and so forth.

In yet another embodiment, a given lens can be associated with a certain view at a first scan, a second view at a second scan a third view at a third scan, and so forth. It should be understood that any combination of above scenarios is possible without departing from the scope of the present disclosure.

Figure 4:
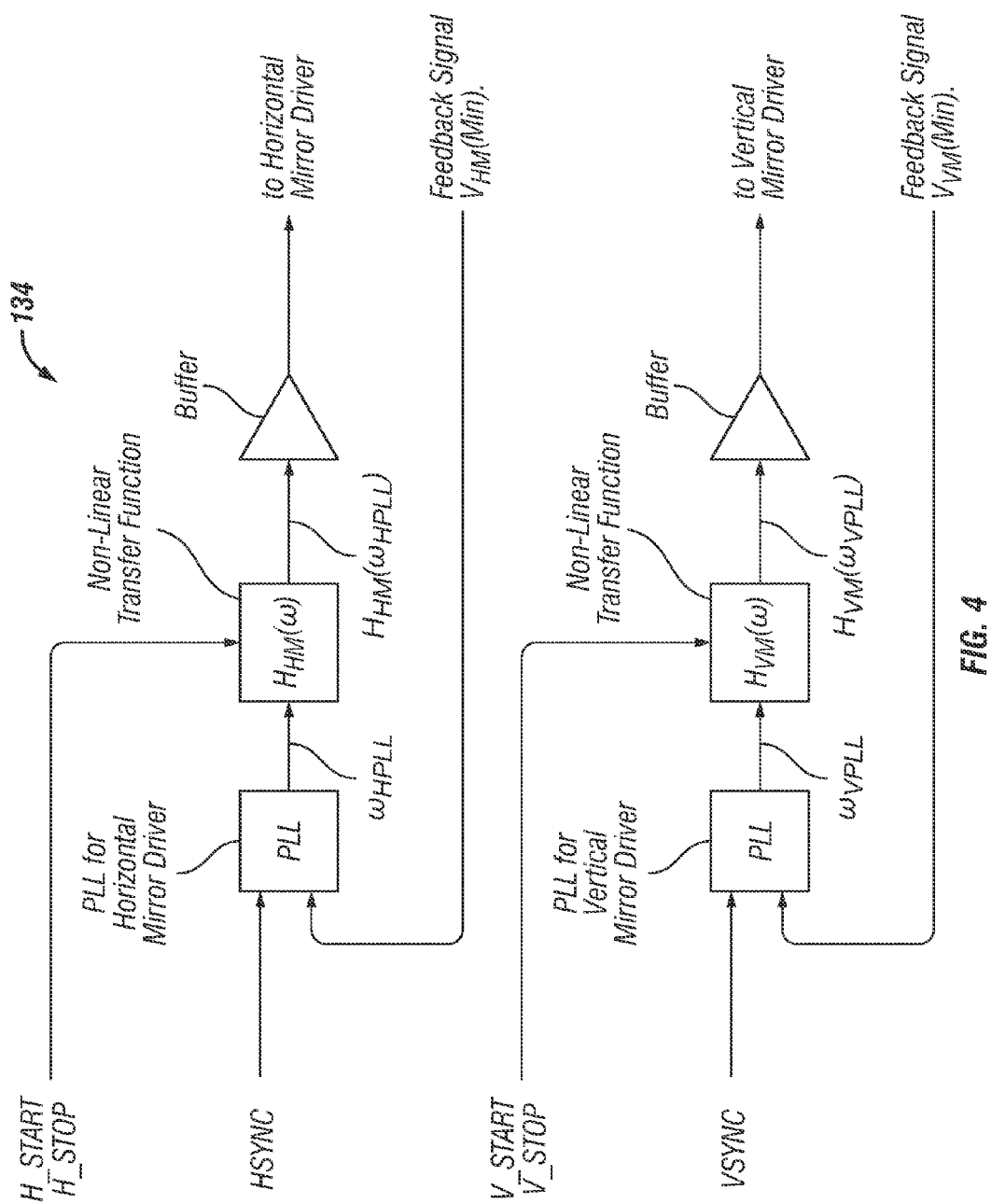
FIG. 4 shows an exemplary detailed XY mirror control, according to one disclosed embodiment.

FIG. 4 shows an exemplary detailed XY minor control 134, according to an exemplary embodiment. As shown in FIG. 4, the output of 3D rendering engine 132 (and particularly HSYNC and VSYNC from a timing generator (not shown), for example) can be input to XY minor control 134. Along with feedback, VSYNC and HSYNC can be used to output respective signals 136 (see FIG. 1A) to the vertical and horizontal minor drivers 150.

The feedback signal $V_{HM}$ from the horizontal minor assembly can be a function of the x location being swept by the minor assembly. The horizontal synchronization signal, whose rising edge can indicate the beginning of a horizontal sweep, can coincide with the minimum of the feedback signal $V_{HM}$(Min). A phase locked loop can compare the feedback signal $V_{HM}$ with HSYNC and adjust the phase and/or frequency of signal $\omega_{HPLL}$ such that the minimum of the feedback signal is synchronous with the rising edge of HSYNC.

Similarly, the feedback signal $V_{VM}$ from the vertical minor assembly can be a function of the y location being swept by the vertical mirror assembly. The vertical synchronization signal VSYNC, whose rising edge can indicate the beginning of a vertical sweep, can coincide with the minimum of the feedback signal $V_{VM}$(Min). A phase locked loop can compare the feedback signal $V_{VM}$ with VSYNC and adjust the phase and/or frequency of signal $\omega_{VPLL}$ such that the minimum of the feedback signal is synchronous with the rising edge of VSYNC.

Figure 5:
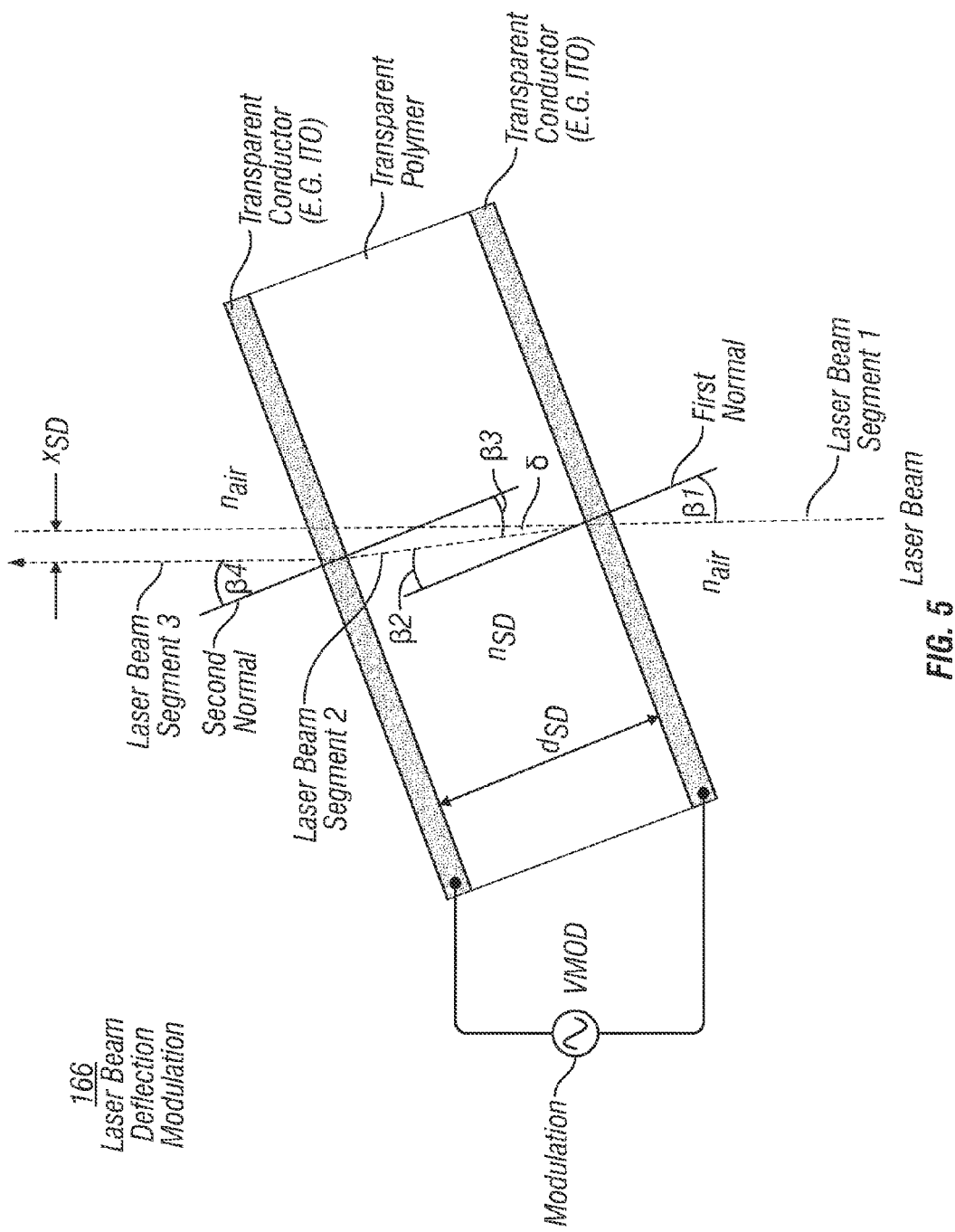
FIG. 5 shows one exemplary sub deflection modulator, according to one disclosed embodiment.

The horizontal minor driver can have a programmable transfer function $H_{HM}(\omega)$ in order to linearize $X_{MLA}(t)$ and achieve constant sweep velocity along the x-axis of the micro lens array. This can ensure that the index of a micro-lens being swept across the x-axis coincides with the horizontal address H_ADDR. Similarly, the vertical minor driver can have a programmable transfer function $H_{VM}(\omega)$ in order to linearize $Y_{MLA}(t)$ and achieve constant sweep velocity along the y-axis of the micro-lens array. This can ensure that the index of a micro-lens being swept across the y-axis coincides with the vertical address count V_ADDR FIG. 5 shows an exemplary sub deflection modulator 166, according to an exemplary embodiment. A total of two sub deflection modulators may be needed for xy sub pixel deflection. The sub deflection modulator 166 can be used to shift the laser beam in x and y directions within the boundaries of a micro lens 121 as to achieve deflection at various angles.

The sub pixel deflection modulator 166 can be tilted by $\beta 1$ relative to the incident laser beam. On the first boundary, where the laser beam enters the transparent polymer, the laser beam can experience refraction and the angle of the refracted beam can be $\beta 2$ relative to a first normal. At the second boundary the refracted laser beam can experience another refraction. The laser-beam exiting the transparent polymer can have an angle $\beta 3$ relative to the second normal.

The relation ship between angles $\beta 1$ and $\beta 2$ and angles $\beta 3$ and $\beta 4$ according to Snell's law are defined as:

$$\frac{\sin(\beta_1)}{\sin(\beta_2)} = \frac{\eta_{SD}(V_{MOD})}{\eta_{AIR}} \text{ and } \frac{\sin(\beta_3)}{\sin(\beta_4)} = \frac{\eta_{AIR}}{\eta_1(V_{MOD})} \quad (14)$$

Here $n_{AIR}$ can be the refractive index of the medium penetrated by laser beam segment 1 (e.g. air in the exemplary embodiment) and $n_{SD}$, can be the voltage dependent refractive index of the transparent polymer. Because the opto-electric polymer can be parallel, $\beta 2 = \beta 3$, $\beta 1 = \beta 4$ and the laser beam can be shifted by $x_{SD}$, relative to the original beam as indicated in FIG. 5. Beam deflection by $x_{SD}$ can be defined as:

$$\sin(\delta) = \frac{x_{SD}}{d_{LBS2}} \quad (15)$$

Where $d_{LBS2}$ is the length of laser beam segment 2 expressed as:

$$\cos(\beta_2) = \frac{d_{SD}}{d_{LBS2}} \rightarrow d_{LBS2} = \frac{d_{SD}}{\cos(\beta_2)} \quad (16)$$

The relative deflection can be defined as:

$$\delta = \beta_1 - \beta_2 \quad (17)$$

The above equations can be combined, to obtain:

$$x_{SD} = d_{SD} \cdot \frac{\sin(\beta_1 - \beta_2)}{\cos(\beta_2)} \quad (18)$$

Here angle $\beta 2$ can be defined based on above equations as:

$$\beta_2 = \sin^{-1}\left(\frac{\eta_{AIR}}{\eta_{SD}(V_{MOD})} \cdot \sin(\beta_1)\right) \quad (19)$$

The sub-deflection angle can therefore be modulated by Vmod.

Figure 6:
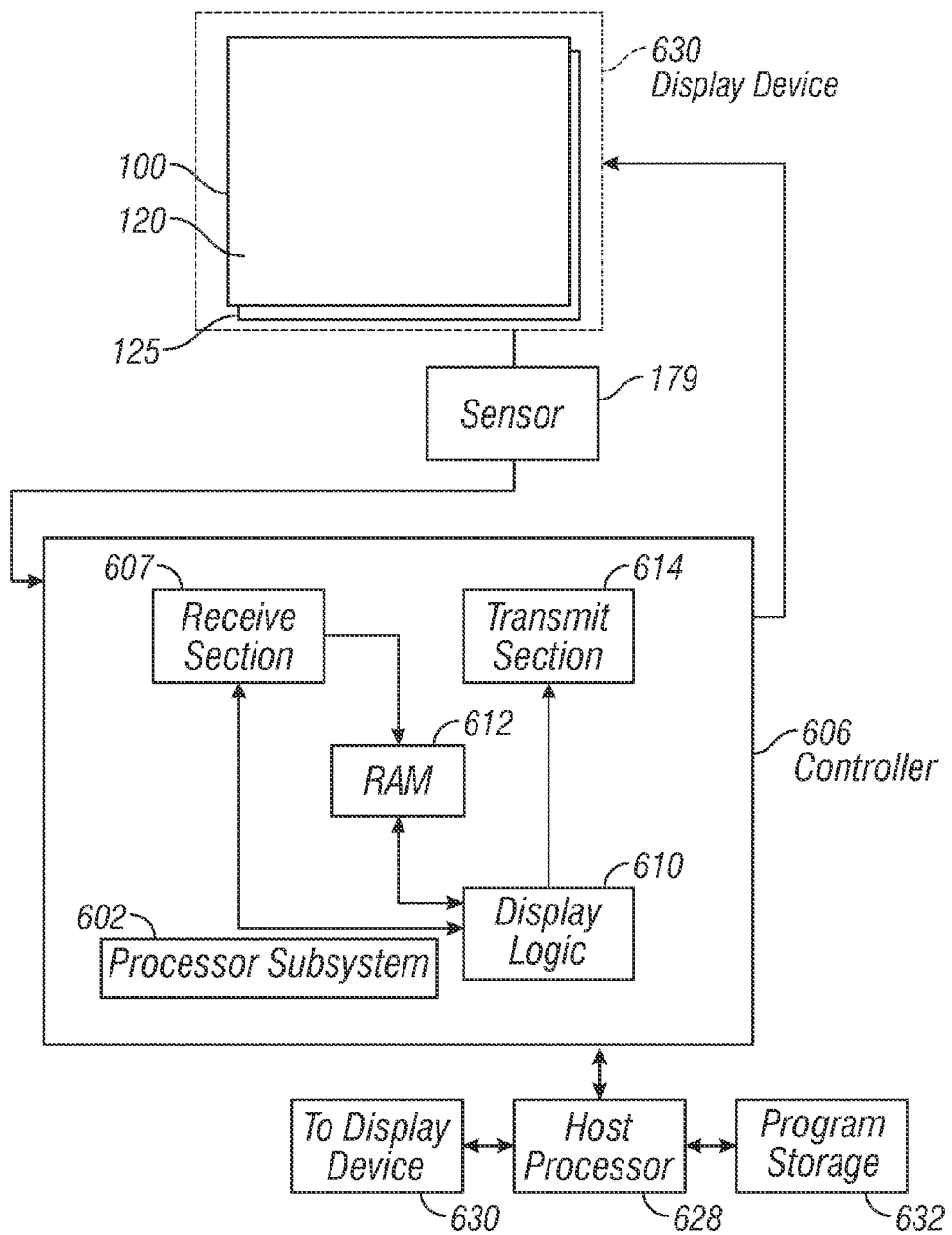
FIG. 6 illustrates an exemplary computing system including an interactive three-dimensional holographic display, according to one disclosed embodiment.

FIG. 6 illustrates exemplary computing system 600 that can include one or more of the embodiments described above. Computing system 600 can include one or more of processor 602 and controller 606. Controller 606 can include, but is not limited to, transmit section 614, receive section 607 and display logic 610. Display logic 610 can access RAM 612. In addition, display logic 610 can control transmit logic 614 to generate an electric field to control the refractive index, and thus a phase shift, at various cells 121, for example. Receive logic 607 receives incoming signals from the optical sensor(s) 150/379, in order to determine the location of an interactive device with respect to the displayed image of the object. In some embodiments, controller 606 and processor 602 can be integrated into a single application specific integrated circuit (ASIC).

FIG. 4 shows an exemplary detailed XY mirror control 134, according to an exemplary embodiment. As shown in FIG. 4, the output of 3D rendering engine 132 (and particularly HSYNC and VSYNC from a timing generator (not shown), for example) can be input to XY mirror control 134. Along with feedback, VSYNC and HSYNC can be used to output respective signals 136 (see FIG. 1A) to the vertical and horizontal mirror drivers 150.

The feedback signal V.sub.HM from the horizontal mirror assembly can be a function of the x location being swept by the mirror assembly. The horizontal synchronization signal, whose rising edge can indicate the beginning of a horizontal sweep, can coincide with the minimum of the feedback signal $V_{HM}$(Min). A phase locked loop can compare the feedback signal $V_{HM}$ with HSYNC and adjust the phase and/or frequency of signal $\omega_{HPLL}$ such that the minimum of the feedback signal is synchronous with the rising edge of HSYNC.

Similarly, the feedback signal $V_{VM}$ from the vertical mirror assembly can be a function of the y location being swept by the vertical mirror assembly. The vertical synchronization signal VSYNC, whose rising edge can indicate the beginning of a vertical sweep, can coincide with the minimum of the feedback signal $V_{VM}$(Min). A phase locked loop can compare the feedback signal $V_{VM}$ with VSYNC and adjust the phase and/or frequency of signal $\omega_{VPLL}$ such that the minimum of the feedback signal is synchronous with the rising edge of VSYNC.

The horizontal mirror driver can have a programmable transfer function $H_{HM}(\omega)$ in order to linearize $X_{MLA}(t)$ and achieve constant sweep velocity along the x-axis of the micro lens array. This can ensure that the index of a micro-lens being swept across the x-axis coincides with the horizontal address H_ADDR. Similarly, the vertical mirror driver can have a programmable transfer function $H_{VM}(\omega)$ in order to linearize $Y_{MLA}(t)$ and achieve constant sweep velocity along the y-axis of the micro-lens array. This can ensure that the index of a micro-lens being swept across the y-axis coincides with the vertical address count V_ADDR.

Figure 7A:
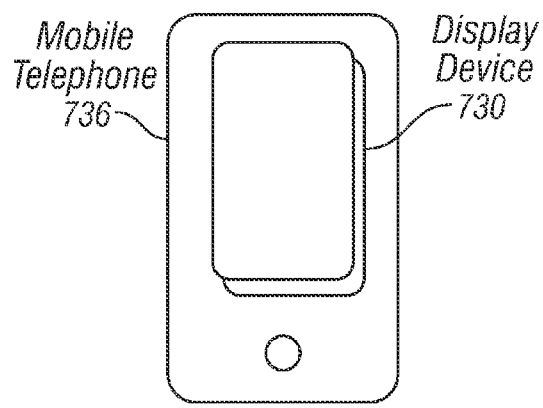
FIG. 7A illustrates an exemplary mobile telephone having an interactive three-dimensional holographic display, according to one disclosed embodiment.
Figure 7B:
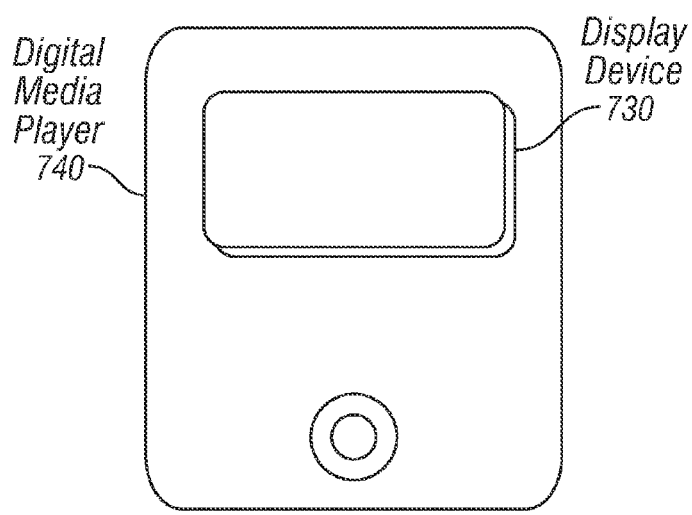
FIG. 7B illustrates an exemplary digital media player having an interactive three-dimensional holographic display, according to one disclosed embodiment.

FIG. 7B illustrates exemplary digital media player 740 that can include a display device 730, the display device 730 including an interactive three-dimensional holographic display, according to one disclosed embodiment.

Figure 7C:
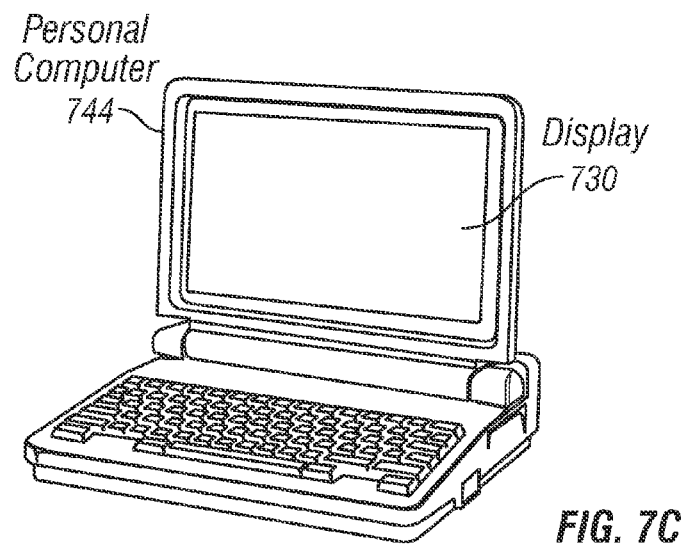
FIG. 7C illustrates an exemplary personal computer having an interactive three-dimensional holographic display, according to one disclosed embodiment.

FIG. 7C illustrates exemplary personal computer 744 that can include a display 730, the display device 730 including an interactive three-dimensional holographic display, according to one disclosed embodiment.

The mobile telephone, media player and personal computer of FIGS. 7A, 7B and 7C, respectively, can provide a three-dimensional viewing and interacting experience, without the requirement of a reflective medium or wearing 3D glasses, according to disclosed embodiments. Accordingly, a truly unobtrusive interactive three-dimensional holographic display can be provided.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A display apparatus configured to produce an interactive three-dimensional holographic image, comprising:
   one or more coherent light sources configured to produce one or more beams, based on obtained image data of an object to display;
   a plurality of sub-deflection modulators each configured to deflect a beam of the one or more beams a deflection distance from a center of a micro lens, wherein the beam continues in a direction after deflection that is approximately parallel to an initial direction of the beam prior to deflection;
   a lens assembly comprising a plurality of micro lenses having the micro lens configured to direct the one or more beams to form a holographic image of the object using a deflection angle, wherein the deflection distance controls where the lens assembly directs the one or more beams;
   one or more optical sensors configured to obtain information regarding whether an interactive object interrupts the one or more beams; and
   a processor configured to determine a location of the interactive object with respect to the holographic image, based on the obtained information from the one or more optical sensors.

2. The display apparatus of claim 1, wherein the lens assembly comprises a collimating lens.

3. The display apparatus of claim 1, wherein the one or more beams are configured to be deflected relative to and parallel to a focal axis of one or more micro lenses of the plurality of micro lenses, in order to change a location to which the beam is directed by the lens assembly.

4. The display apparatus of claim 1, wherein at least one of the one or more beams is modulated with the obtained image data.

5. The display apparatus of claim 1, wherein the one or more coherent light sources comprise a vertical-cavity surface-emitting laser (VCSEL).

6. The display apparatus of claim 1, wherein the one or more coherent light sources comprise a first light source generating a red beam, a second light source generating a green beam and a third light source generating a blue beam.

7. The display apparatus of claim 1, wherein the each of plurality of sub-deflection modulators includes one or more electrostatically controlled cells having a polymer-based material with a variable refractive index controlled by an electric field, wherein a variation of the refractive index changes the deflection distance.

8. The display apparatus of claim 1, wherein the lens assembly comprises a hydrophobic lens or an electro optical polymer.

9. The display apparatus of claim 1, wherein the display apparatus is incorporated within a computing system.

10. The display apparatus of claim 1, wherein the deflection angle comprises a plurality of sub-deflection angles.

11. The display apparatus of claim 10, wherein the processor determines a sub-deflection angle of the plurality of sub-deflection angles in the x direction using the following equation:

$$\beta_{ML\_X} = \arctan\left(\frac{\Delta x_{ML}}{\left((n-1)*\left(\frac{1}{R1} - \frac{1}{R2} + (n-1)*\frac{d}{(n*R1*R2)}\right)\right)}\right),$$

, where $\beta_{ML\_X}$ is a sub-deflection angle in the x direction, n is the refractive index a micro lens of the lens assembly, R1 is a radius of a curvature of a first surface of the micro lens closest to the one or more coherent light sources, R2 is a radius of a curvature of a second surface of the micro lens furthest from the one or more coherent light sources, and d is a thickness of the micro lens.

12. The display apparatus of claim 10, wherein the processor a sub-deflection angle of the plurality of sub-deflection angles in the y direction using the following equation:

$$\beta_{ML\_Y} = \arctan\left(\frac{\Delta y_{ML}}{\left((n-1)*\left(\frac{1}{R1} - \frac{1}{R2} + (n-1)*\frac{d}{(n*R1*R2)}\right)\right)}\right),$$

, where $\beta_{ML\_Y}$ is a sub-deflection angle in the y direction, n is the refractive index a micro lens of the lens assembly, R1 is a radius of a curvature of a first surface of the micro lens closest to the one or more coherent light sources, R2 is a radius of a curvature of a second surface of the micro lens furthest from the one or more coherent light sources, and d is a thickness of the micro lens.

13. A method for producing an interactive three-dimensional holographic image, comprising:
   generating one or more beams, based on obtained image data of an object to display;
   determining one or more deflection angles of the one or more beams;
   deflecting a beam of the one or more beams a deflection distance from a center of a micro lens, wherein the beam continues in a direction after deflection that is approximately parallel to an initial direction prior to deflection;

directing the one or more beams to form a holographic image of the object, wherein each beam of the one or more beams is deflected at a deflection angle of the plurality of deflection angles, wherein the deflection angle is based at least in part on a deflection distance and a surface function of a plurality of micro lenses including the micro lens;

obtaining information regarding whether an interactive object interrupts the one or more beams; and determining a location of the interactive object with respect to the holographic image, based on the obtained information.

14. The method of claim 13, wherein directing the one or more beams comprises:

receiving and collimating a plurality of deflected beams with a first lens; and steering the one or more beams with a second lens having the plurality of micro lenses.

15. The method of claim 14, wherein steering the one or more beams comprises steering a plurality of the one or more deflected beams using one micro lens of the second lens, wherein the plurality of the one or more deflected beams is associated with a plurality of desired viewing angles.

16. The method of claim 15, wherein deflecting the beam comprises causing the beam to deflect relative to and parallel to a focal axis of the micro lens.

17. The method of claim 13, comprising modulating at least one of the one or more beams with the obtained image data.

18. The method of claim 17, comprising modulating the obtained image data with an angle modulation function derived based on the deflection angle and a surface function of the micro lens.

19. The method of claim 13, wherein generating the one or more beams comprises generating the one or more beams using a vertical-cavity surface-emitting laser (VCSEL).

20. The method of claim 13, wherein the one or more beams comprises a red beam, a green beam and a blue beam.

21. The method of claim 13, wherein directing the one or more beams comprises dynamically changing a phase shift of at least one of the one or more beams, by changing a refractive index of at least one of a plurality of electrostatically controlled cells having a polymer-based material with a variable refractive index controlled by an electric field, to produce constructive interference between a plurality of beams.

22. The method of claim 13, wherein the directing the one or more beams comprises dynamically changing a phase shift of at least one of the one or more beams, by changing the refractive index of at least one of a plurality of electrostatically controlled cells having using an electrowetting effect to change a relative position of a conductive element relative to a non-conductive liquid to modulate a refractive index, to produce constructive interference between a plurality of beams.

23. The method of claim 13, wherein determining a plurality of deflection angles comprises determining a plurality of sub-deflection angles for each deflection angle of the plurality of deflection angles.

24. The method of claim 23, comprising determining a sub-deflection angle of the plurality of sub-deflection angles in the x direction using the following equation:

$$\beta_{ML\_X} = \arctan\left(\frac{\Delta x_{ML}}{\left((n-1)*\left(\frac{1}{R1} - \frac{1}{R2} + (n-1)*\frac{d}{(n*R1*R2)}\right)\right)}\right),$$

, where $\beta_{ML\_X}$ is a sub-deflection angle in the x direction, n is the refractive index a micro lens of the lens assembly, R1 is a radius of a curvature of a first surface of the micro lens closest to the one or more coherent light sources, R2 is a radius of a curvature of a second surface of the micro lens furthest from the one or more coherent light sources, and d is a thickness of the micro lens.

25. The method of claim 23, comprising determining a sub-deflection angle of the plurality of sub-deflection angles in the y direction using the following equation:

$$\beta_{ML\_Y} = \arctan\left(\frac{\Delta y_{ML}}{\left((n-1)*\left(\frac{1}{R1} - \frac{1}{R2} + (n-1)*\frac{d}{(n*R1*R2)}\right)\right)}\right),$$

, where $\beta_{ML\_Y}$ is a sub-deflection angle in the y direction, n is the refractive index a micro lens of the lens assembly, R1 is a radius of a curvature of a first surface of the micro lens closest to the one or more coherent light sources, R2 is a radius of a curvature of a second surface of the micro lens furthest from the one or more coherent light sources, and d is a thickness of the micro lens.

* * * * *

UNITED STATES PATENT AND TRADEMARK OFFICE
CERTIFICATE OF CORRECTION

PATENT NO. : 8,847,919 B2  
APPLICATION NO. : 13/019971  
DATED : September 30, 2014  
INVENTOR(S) : Christoph Horst Krah It is certified that error appears in the above-identified patent and that said Letters Patent is hereby corrected as shown below:

In the Specification

In column 10, line 58, replace "minor" with --mirror--.

In column 10, line 62, replace "minor" with --mirror--.

In column 10, line 66, replace "minor" with --mirror--.

In column 11, line 1, replace "minor" with --mirror--.

In column 11, line 8, replace "minor" with --mirror--.

In column 11, line 18, replace "minor" with --mirror--.

In column 11, line 23, replace "minor" with --mirror--.

Signed and Sealed this  
Fifth Day of May, 2015

Michelle K. Lee  
*Director of the United States Patent and Trademark Office*